United States Patent [19]

Circle

[11] Patent Number: 4,741,107
[45] Date of Patent: May 3, 1988

[54] ARTWORK AID ADAPTED FOR FACILITATING PLACEMENT OF LETTERING ALONG ARC OF A CIRCLE

[76] Inventor: Jeffrey L. Circle, R.R. 11, Box 735, Indianapolis, Ind. 46229

[21] Appl. No.: 80,098

[22] Filed: Jul. 31, 1987

[51] Int. Cl.$^4$ ............................................. G09B 11/00
[52] U.S. Cl. ..................................... 33/1 AA; 33/623; 434/162
[58] Field of Search ............ 33/1 G, 1 K, 1 AA, 613, 33/623, 645, 653; 312/231; 434/85, 88, 90, 162, 163

[56] References Cited

U.S. PATENT DOCUMENTS

| | | | |
|---|---|---|---|
| 864,850 | 9/1907 | Lange | 434/162 |
| 997,418 | 7/1911 | Sayles | 33/1 AA |
| 1,041,435 | 10/1912 | Cross | 434/85 |
| 1,558,041 | 10/1925 | Phares | 434/88 |
| 2,238,106 | 4/1941 | Fleischer | 33/623 |
| 4,689,017 | 8/1987 | Lehti | 33/1 K |

FOREIGN PATENT DOCUMENTS 335064  9/1930  United Kingdom ................. 434/90

Primary Examiner—Richard R. Stearns

[57] ABSTRACT

Artwork often involves the placement of lettering along the arc of a circle. Practice is to use a compass to lay out the arc and then place the lettering along the arc. The arc is then erased. The present invention provides a lightbox whose platen is fitted with a vertical centerline and a pivot. Basemarks are positioned along the centerline, each at a distance from the pivot equal to the radius of a desired arc. The art sheet is placed on the platen so that the center of the desired arc falls over the pivot. The sheet is rotated about the pivot as successive letters are applied. The desired basemark is used as a position indicator for the base of each letter. The letter is oriented so that the centerline bisects it vertically. In one embodiment the pivot is adapted for use in punching a hole in the art paper.

5 Claims, 1 Drawing Sheet

ARTWORK AID ADAPTED FOR FACILITATING PLACEMENT OF LETTERING ALONG ARC OF A CIRCLE

SUMMARY

Lettering on athletic jerseys often appears along the arc of a circle. The present invention is an aid for preparing the artwork for such lettering. A vertical centerline is placed on the platen of a lightbox. At a convenient point along this centerline a pivot is placed. Basemarks are placed on this centerline at distances from the pivot equal to desired radii. The art paper is placed on the platen so that a hole in the art paper falls over the pivot, and the position for the first letter falls over the desired basemark. The letter is applied so that its base falls on the basemark and the letter is bisected vertically by the centerline. The paper is rotated and succeeding letters applied in similar manner.

THE DRAWINGS

BACKGROUND OF THE INVENTION

It has been general practice to place the name of the team in an arc across the front of each baseball player's uniform. The same for players in other sports. And the jackets of their most enthusiastic fans.

Figure 1:
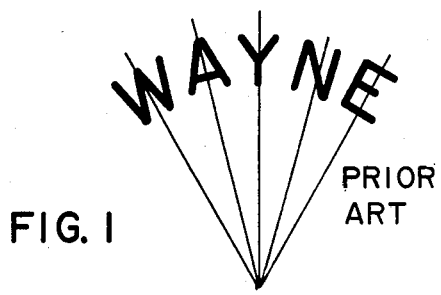
FIG. 1 is a prior art sketch indicating principles involved.

This lettering is usually applied via a silk screening process. Which requires that art work be first prepared. For positioning the lettering, a bar compass has been used to draw the arc on the art paper. Then the letters are applied so that their bases are tangent to the arc. This is best accomplished by drawing a radius to each position at which a letter is to be placed and then placing each letter so that it is bisected by its respective radius. See FIG. 1. Then erase arc and radii.

The system is good. But it does suffer from a couple minor drawbacks. One has to draw the arc—and later erase it. And, one has to find the compass—which is usually under some papers in a remote corner of the room.

DETAILED DESCRIPTION OF THE PREFERRED EMBODIMENT

Figure 2:
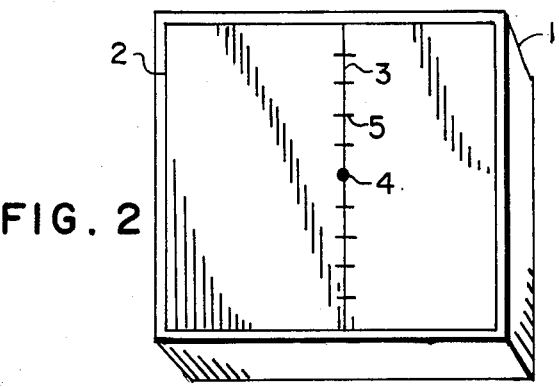
FIG. 2 is a sketch of a lightbox modified in accordance with the present invention.

Lightbox 1 of FIG. 2 contains platen 2. A vertical centerline 3 is scribed on platen 2. Pivot 4 is mounted on centerline 3. A set of baselines 5 are drawn at distances from pivot 4 equal to radii of interest. In the preferred embodiment, pivot 4 is a dowel approximately 5 mm in diameter slipped into a hole in platen 2.

Figure 3:
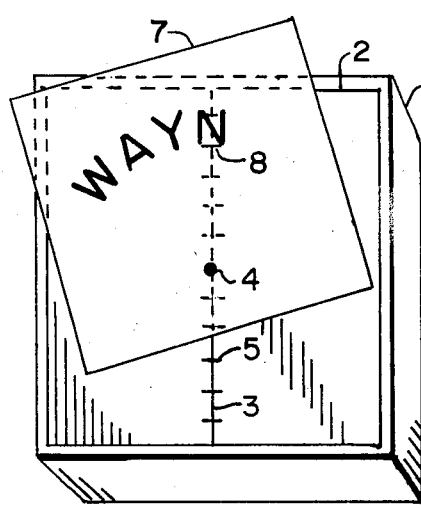
FIG. 3 is a perspective view of a lightbox modified in accordance with the present invention and being used to apply lettering.

Suppose it is desired to place the word "WAYNE" along an arc. See FIG. 3. The following procedure is employed:

1. Art paper 7 is placed over platen 2 with the hole (prepunched) fitting over pivot 4. Paper is translucent—centerline 3 and basemarks 5 are visible through it.

2. Art paper 7 is rotated to bring the position of the "W" over the selected basemark 8.

3. The "W" is fixed to art paper 7—the vertical centerline of the "W" coinciding with centerline 3 and the base of the "W" being placed over basemark 8.

4. The paper 7 is rotated to bring the position for the "A" over selected basemark 8. Letter "A" is fixed to art paper 7, as in Step 3.

5. The operation is repeated for succeeding letters.

6. Art paper 7 is then rotated to bring the center of the letter array over centerline 3.

7. Art paper 7 is "squared up". Both sides are made parallel to centerline 3. Top and bottom are sheared perpendicular to centerline 3.

Figure 4:
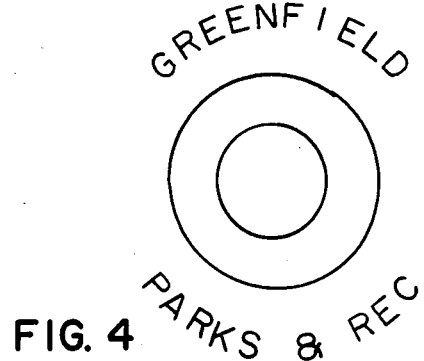
FIG. 4 is a sketch of artwork easily produced using the present invention.

FIG. 4 is a sketch of artwork conveniently produced using the present invention.

Figure 5:
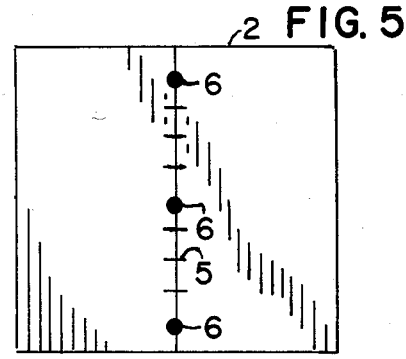
FIG. 5 is a sketch of a platen bearing a set of basemarks and three pivot holes.
Figure 6:
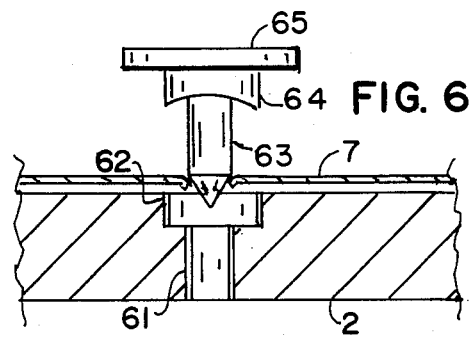
FIG. 6 is a sketch partiallly in section of a pivot system adapted for punching the center hole in the art sheet being used.

In the preferred system, pivot 4 is just a round dowel dropped into hole 6 of FIG. 5 which has been drilled into but not through platen 2. The preferred system suffers the shortcoming that either prepunched paper must be used—or, the user must have a capability for making holes near the center of the sheet. However, readily available punches are usually adapted for punching holes near the left edge of pages so that they may be fitted into looseleaf notebooks. To circumvent the need for a punch not readily available on the market, pivot 4 may be modified and used in the structure of FIG. 6. Each hole 6 in platen 2 consists of a guide section 61 and a punch section 62. Each section is round and the two are concentric. Pivot 4 consists of a Pin 63, a punch 64, and a top 65. Use is as follows:

1. Pin 63 is pressed through art paper 7 at the desired pivot position.

2. Art paper 7 is placed on Platen 2 so that Pin 63 drops into guide section 61.

3. Top 65 is dealt a sharp blow with the heel of the hand, driving punch 64 through art paper 7 and causing punch 64 to seat in punch section 62.

During the lettering operation, art paper 7 is generally subjected to a series of small jerks. If pivot 4 is less than 5 mm in diameter, these small jerks tend to enlarge the hole in art paper 7. If lightweight paper is used, tears in the paper result.

Figure 7:
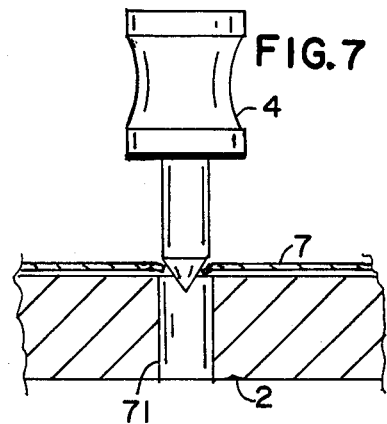
FIG. 7 is a view partially in section of an alternate pivot system utilizing the commonly available map pin.

If the person using the system exercises some care and the art paper used is moderately heavy, then the hole size may be reduced and the structure simplified. FIG. 7 shows such a simplified structure. Pivot 4 becomes an ordinary map pin, readily available from dime stores. Hole 71 in platen 2 matches the diameter of map pin 4.

Basemarks 5 are generally short horizontal marks crossing centerline 3. However, they may be just dots along centerline 3—or gaps in centerline 3. If prepunched paper is used and intended use is such that pivot 4 may remain in just one position, pivot 4 may be permanently affixed to platen 2.

I claim:

1. An aid for use in artwork involving the placement of lettering along the arc of a circle;

said aid comprising a lightbox having a translucent platen, a vertical centerline scribed on said platen, a basemark on said centerline, and a pivot means located on said centerline;

said platen being adapted for supporting a sheet of art paper;

said pivot means being adapted for serving as a center extending through a hole in the art paper about which said art paper can be rotated;

said basemark serving as a position indicator for placement of successive letters of said lettering; and said centerline serving as a guide for orientation of said lettering.

2. An aid as in claim 1; and
having a set of basemarks distributed along said centerline, said basemark being selected from said set of basemarks.

3. An aid as in claim 1; and
said pivot means comprising a set of three holes along said centerline;

a first of said holes being near the top of said platen and adapted for use in placing lettering along the bottom portion of a circle;

a second of said holes being near the bottom of said platen and adapted for use in placing lettering along the top portion of a circle; and a third of said holes being near the center of said platen and adapted for use in placing lettering along both the top and bottom portions of a circle.

4. An aid as in claim 3;
each of said holes having a guide section extending upward from the underside of said platen and being approximately 2 mm in diameter;

each of said holes having a punch section extending downward from the upper side of said platen, said punch section being concentric with said guide section, and said punch section being significantly larger in diameter than said guide section;

said pivot means having a pin adapted for fitting into said guide section;

said pivot means having a punch concentric with said pin and slightly less in diameter than said punch section;

said pivot means having a top affixed to the free end of said punch section; and the pivot means being adapted for use in punching a hole in said art paper.

5. An aid as in claim 3;
said pivot means being a commonly available pin having a head and a shaft; and each of said holes in said platen being of slightly larger diameter than the diameter of said shaft.

* * * * *